(12) United States Patent
Callenbach et al.

(10) Patent No.: US 7,767,131 B2
(45) Date of Patent: Aug. 3, 2010

(54) METHOD FOR PRODUCTION OF MOULDED BODIES, IN PARTICULAR OPTICAL STRUCTURES AND USE THEREOF

(75) Inventors: Tilo Callenbach, Jona (CH); Max Gmür, Mosnang (CH); Heinz Lüthi, Lachen (CH); Martin Andreas Bopp, Basel (CH); Michael Pawlak, Laufenburg (DE); Markus Ehrat, Magden (CH)

(73) Assignees: Bayer Technology Services GmbH, Leverkusen (DE); Weidmann Plastics Technology AG, Rapperswil (CH)

( * ) Notice: Subject to any disclaimer, the term of this patent is extended or adjusted under 35 U.S.C. 154(b) by 1257 days.

(21) Appl. No.: 10/487,998

(22) PCT Filed: Aug. 26, 2002

(86) PCT No.: PCT/EP02/09499

§ 371 (c)(1), (2), (4) Date: Feb. 27, 2004

(87) PCT Pub. No.: WO03/020488

PCT Pub. Date: Mar. 13, 2003

(65) Prior Publication Data

US 2004/0197595 A1 Oct. 7, 2004

(30) Foreign Application Priority Data

Aug. 30, 2001 (CH) .................................. 1618/01

(51) Int. Cl.
B29C 45/16 (2006.01)

(52) U.S. Cl. .................... 264/328.1; 264/1.24; 264/1.7; 264/226; 264/255

(58) Field of Classification Search ................ 427/126.2
See application file for complete search history.

(56) References Cited

U.S. PATENT DOCUMENTS

| | | | |
|---|---|---|---|
| 4,190,321 A * | 2/1980 | Dorer et al. ................ | 359/581 |
| 4,363,844 A * | 12/1982 | Lewis et al. .............. | 428/848.5 |
| 4,364,995 A * | 12/1982 | Crawford et al. ........... | 428/336 |
| 4,612,409 A * | 9/1986 | Hamakawa et al. ......... | 136/244 |
| 4,619,804 A | 10/1986 | Leonard et al. | |
| 4,649,280 A | 3/1987 | Holland et al. | |
| 4,689,380 A | 8/1987 | Nahm | |
| 4,815,843 A | 3/1989 | Tiefenthaler et al. | |
| 4,874,808 A | 10/1989 | Minami et al. | |
| 4,899,005 A | 2/1990 | Lane et al. | |
| 4,918,133 A | 4/1990 | Moriya et al. | |
| 4,935,475 A | 6/1990 | Kishimura et al. | |
| 4,948,856 A | 8/1990 | Minchak et al. | |
| 5,006,716 A | 4/1991 | Hall | |
| 5,082,629 A | 1/1992 | Burgess, Jr. et al. | |
| 5,115,052 A | 5/1992 | Wamura et al. | |
| 5,206,306 A | 4/1993 | Shen | |
| 5,270,393 A | 12/1993 | Sagane et al. | |
| 5,272,235 A | 12/1993 | Wakatsuru et al. | |
| 5,278,214 A | 1/1994 | Moriya et al. | |
| 5,278,238 A | 1/1994 | Lee et al. | |
| 5,290,589 A * | 3/1994 | Clough et al. ............ | 427/126.3 |
| 5,478,755 A | 12/1995 | Attridge et al. | |
| 5,532,030 A | 7/1996 | Hirose et al. | |
| 5,534,606 A | 7/1996 | Bennett et al. | |
| 5,728,324 A * | 3/1998 | Welch et al. ............... | 264/2.5 |
| 5,756,130 A | 5/1998 | Umebayashi et al. | |
| 5,759,455 A | 6/1998 | Kamitakahara et al. | |
| 5,783,371 A | 7/1998 | Bifano | |

(Continued)

FOREIGN PATENT DOCUMENTS

EP    0 319 350 A2    6/1989

(Continued)

OTHER PUBLICATIONS

Database WPI, Section Ch, Week 198542, Derwent Publications Ltd., London, GB; Class A32, AN 1985-259861, XP002220595 and JP 60 173738 A (Nippon Telegraph & Telephone Corp.), Sep. 7, 1985, Abstract.

(Continued)

Primary Examiner—Monica A Huson
(74) Attorney, Agent, or Firm—Wenderoth, Lind & Ponack, L.L.P.

(57) ABSTRACT

The present invention relates to a method for manufacture a body from a thermoplastic plastic with a three-dimensionally structured surface, wherein molding is performed directly from a master made of glass coated with metal oxide, without deposition of further coatings on a surface of the master. The invention also relates to bodies manufactured with this method from a thermoplastic featuring a three-dimensionally structured surface, as well as to planar optical structures likewise manufactured with this method for generating evanescent-field measuring platforms and to a use thereof. The invention furthermore relates to a planar optical structure for generating an evanescent-field measuring platform, comprising a first essentially optical transparent, waveguiding layer (a) with refractive index $n_1$ and a second essentially optical transparent layer (b) with refractive index $n_2$, where $n_1 > n_2$, in a case of an embodiment of a planar optical film waveguide, or comprising a metal layer (a') and a second layer (b), in a case of an embodiment for generating a surface plasmon resonance, wherein the second layer (b) comprises a material from a group comprising cyclo-olefin polymers and cyclo-olefin copolymers.

49 Claims, No Drawings

U.S. PATENT DOCUMENTS

| | | | |
|---|---|---|---|
| 5,841,143 | A | 11/1998 | Tuma et al. |
| 5,910,287 | A | 6/1999 | Cassin et al. |
| 6,039,897 | A * | 3/2000 | Lochhead et al. .......... 264/1.24 |
| 6,063,886 | A | 5/2000 | Yamaguchi et al. |
| 6,120,870 | A | 9/2000 | Nebashi et al. |
| 6,245,412 | B1 | 6/2001 | Choquette et al. |
| 6,421,128 | B1 * | 7/2002 | Salamon et al. ............. 356/445 |

FOREIGN PATENT DOCUMENTS

| | | |
|---|---|---|
| EP | 0 496 358 A1 | 7/1992 |
| EP | 0 503 961 A2 | 9/1992 |
| EP | 0 533 074 A1 | 3/1993 |
| EP | 0 540 843 A1 | 5/1993 |
| EP | 1 068 945 A2 | 1/2001 |
| EP | 1 102 254 A1 | 5/2001 |
| WO | 87/02935 | 5/1987 |
| WO | 92/19976 | 11/1992 |
| WO | 95/33197 | 12/1995 |
| WO | 95/33198 | 12/1995 |
| WO | 98/09156 | 3/1998 |
| WO | 99/13320 | 3/1999 |
| WO | 01/88511 A1 | 11/2001 |

OTHER PUBLICATIONS

Database WPI, Section Ch, Week 198505, Derwent Publications Ltd., London, GB; Class A32, AN 1985-028752, XP002190103 & JP 59 224320 A (Sanyo Electric Co.), Dec. 17, 1984, Abstract.

Patent Abstracts of Japan, vol. 10, No. 266 (p. 496), Sep. 11, 1986 & JP 61 090344 A (Ricoh Co. Ltd.), May 8, 1996, Abstract.

Database INSPEC 'Online!, Institute of electrical engineers', Stevenage, GB; J. Dübendorfer et al., "Reference pads for miniature integrated optical sensors", Database accession No. 5642018, XP002190102, Abstract & 3rd European Conference on optical chemical sensors and biosensors, Europt(r)ode III, Zürich, Mar.31-Apr. 3, 1996, vol. B38, No. 1-3, pp. 116-121, Sensors and Actuators B (Chemical), Jan.-Feb. 1997, Elsevier, Switzerland ISSN: 0925-4005.

J. Dübendorfer et al., "Compact integrated optical immunosensor using replicated chirped grating coupler sensor chips", Applied Optics, Optical Society of America, Washington, U.S., vol. 37, No. 10, Apr. 1, 1998, pp. 1890-1894; XP000754337, ISSN: 0003-6935 p. 1891, para. 3.

H. Vollmer, W. Ehrfeld, and P. Hagmann, "Untersuchungen zur Herstellung von galvanisierbaren Mikrostrukturen mit extremer Strukturhöhe durch Abformung mit Kunststoff im Vakuum-Reaktionsgießverfahren", Report 4267 of the KfK, Karlsruhe, Germany, 1987.

P. Hagman and W. Ehrfeld, "Fabrication of Microstructures of Extreme Structural Heights by Reaction Injection Molding", International Polymer Processing IV (1989) 3, pp. 188-195.

T. Bouillon, "Mikromechanik- Bedeutung und Anwendung von Mikrostrukturen aus Kunststoffen, Metallen und Keramik", seminar paper at the IKV, RWTH Aachen, cited in A. Rogalla, "Analyse des Spritzgißens mikrostrukturierter Bauteile aus Thermoplasten", IKV Berichte aus der Kunststoffverarbeitung, vol. 76, Verlag Mainz, Wissenschaftsverlag Aachen, Germany, 1998.

W. Michaeli, H. Greif, G. Kretzschmar, H. Kaufmann und R. Bertulait, "Technologie des Spritzgießens", Carl Hanser Verlag München Wien 1993, p. 69.

K. Tiefenthaler, W. Lukosz, "Sensitivity of grating couplers as integrated-optical chemical sensors", J. Opt. Soc. Am. B6, 209 (1989).

W. Lukosz, Ph.M. Nellen, Ch. Stamm, P. Weiss, "Output Grating Couplers on Planar Waveguides as Integrated, Optical Chemical Sensors", Sensors and Actuators B1, 585 (1990).

T. Tamir, S.T. Peng, "Analysis and Design of Grating Couplers", Appl. Phys. 14, 235-254 (1977).

Product information Sheet TOPAS 8007 (Mar. 15, 2000).

Product information Sheet TOPAS 5013 (Mar. 15, 2000).

Product information Sheet TOPAS 6013 (Mar. 15, 2000).

Product information Sheet TOPAS 6015 (Mar. 15, 2000).

Product information Sheet TOPAS 6017 (Mar. 15, 2000).

Powerpoint product presentation "Cyclo-Olefin Polymer ZEONEX and ZEONOR", Nippon Zeon Co., Ltd., Zeon Chemical L.P.

* cited by examiner

METHOD FOR PRODUCTION OF MOULDED BODIES, IN PARTICULAR OPTICAL STRUCTURES AND USE THEREOF

BACKGROUND OF THE INVENTION

The invention described herein comprises a novel process for manufacturing a body from a thermoplastic plastic with a three-dimensionally structured surface, wherein molding is performed directly from a master made of glass coated with metal oxide, without deposition of further coatings on a surface of the master. A method according to the invention thus comprises fewer operational steps than corresponding conventional molding processes, which will lead to decreases in manufacturing costs. Furthermore, as a result of a smaller number of processing steps to be performed before molding on a corresponding master, risk of damage to the surface of the master, which is inevitably carried over as defects in molded bodies, is markedly reduced, which means a substantial advance in a production process.

A surface free of defects is especially important for optimization of planar waveguides, especially for applications in bioanalytics, in order to avoid scatter of guided excitation light at scatter centers and/or as a result of high surface roughness. A goal is to achieve a lowest possible surface roughness of a planar waveguide.

If in-coupling of excitation light into a waveguide takes place by use of a diffractive relief grating, then an extraordinary uniformity and reproducibility of these structures with dimensions of often only a few nanometers is necessary. In a case of manufacture of such waveguides from plastic substrates, high requirements are thus placed on corresponding molding processes.

Such periodic structures like surface relief gratings, in combination with thin metal layers deposited thereon (typically layers of gold or silver with thicknesses on the order of magnitude of about 40 nm-200 nm) on an underlying dielectric layer with a lower refractive index are also suitable for creating conditions for a surface plasmon resonance which, similar to waveguiding in an optical waveguide, is associated with formation of an evanescent field (with exponential decay in intensity in a direction of adjacent media), along propagation of the surface plasmon (instead of a guided wave). The formation of the evanescent field is explained more precisely below in an example of an optical waveguide. The term waveguiding is understood here to mean that a propagation length of a wave "guided" in a highly refractive layer shall correspond, expressed in a ray model of classical optics, at least to a distance in this layer between two total reflections at interfaces of this layer to adjacent low-refractive media or layers, opposite to one another. In a low-loss waveguide, propagation length may amount to several centimeters (or even kilometers, as in telecommunications); in a waveguide with a large-area modulated grating structure (depending on depth of grating) it may also measure some micrometers to a few millimeters, which is comparable with a typical propagation length of surface plasmons (typically on the order of magnitude of 100 μm). Such essentially planar optical structures, such as optical film waveguides and structures with a thin metal coating on a dielectric substrate of lower refractive index, which are described more closely below and which are suitable for generating an evanescent field, should be commonly described as "planar optical structures for generating evanescent field measuring platforms".

The invention also relates to variable embodiments of "planar optical structures for generating evanescent-field measuring platforms", wherein a layer (b) comprises a material from a group comprising cyclo-olefin polymers and cyclo-olefin copolymers. In particular the invention relates to a planar optical film waveguide, comprising a first essentially optically transparent waveguiding layer (a) with refractive index $n_1$ and a second essentially optically transparent layer (b) with refractive index $n_2$, where $n_1 > n_2$, wherein the second layer (b) comprises a material from a group formed by cyclo-olefin polymers and cyclo-olefin copolymers.

The invention relates also to an analytical system with a planar optical structure according to the invention for generating an evanescent field measurement arrangement as a main component, as well as methods for manufacturing such planar optical structures and methods based on use thereof for detecting one or more analytes in one or more samples.

To achieve lower limits of detection, numerous measurement arrangements have been developed in the last years, in which detection of an analyte is based on its interaction with an evanescent field, which is associated with light guiding in an optical waveguide, wherein biochemical or biological recognition elements for specific recognition and binding of analyte molecules are immobilized on a surface of the waveguide.

When a light wave is in-coupled into an optical waveguide surrounded by optically rarer media, i.e. media of a lower refractive index, the light wave is guided by total reflection at interfaces of a waveguiding layer. In this arrangement, a fraction of electromagnetic energy penetrates into the optically rarer media. This portion is termed an evanescent or decaying field. A strength of the evanescent field depends to a very great extent on a thickness of the waveguiding layer itself and on a ratio of refractive indices of the waveguiding layer and surrounding media. In the case of thin-film waveguides, i.e. layer thicknesses that are the same as or thinner than a wavelength of light to be guided, discrete modes of guided light can be distinguished. Analyte detection methods in an evanescent field have an advantage in that interaction with an analyte is limited to a penetration depth of the evanescent field into an adjacent medium, on the order of magnitude of some hundred nanometers, and interfering signals from a depth of the medium can be largely avoided. First proposed measurement arrangements of this type were based on highly multi-modal, self-supporting single-layer waveguides, such as fibers or plates of transparent plastic or glass, with thicknesses from some hundred micrometers up to several millimeters.

Planar thin-film waveguides have been proposed in order to improve sensitivity and at the same time facilitate mass production. A planar thin-film waveguide in a simplest case comprises a three-layer system: carrier material, waveguiding layer, and superstrate (i.e. a sample to be analyzed), wherein the waveguiding layer has a highest refractive index. Additional intermediate layers can further improve action of the planar waveguide. Essential requirements placed on properties of the waveguiding layer itself and on a layer in contact therewith in a direction of the substrate or carrier material or on the substrate or the carrier material itself are in this case a maximum possible transparency at a wavelength of light to be guided, together with a minimum possible intrinsic fluorescence and a minimum possible surface roughness, in order for the light to be guided as free from interference as possible. Suitable substrate materials are therefore, for example, glass or plastics with corresponding properties, as has been widely described (e.g. in WO 95/33197 and WO 95/33198), with glass having proved more advantageous to date with regard to poverty of fluorescence (on excitation in a visible spectrum) and low surface roughness. A reason for the low surface roughness which can be achieved for glass substrates is in particular a possibility of heating these up to high temperatures so that formation of a roughness-enhancing microcolumn structure can be largely prevented.

In the case of plastic substrates, deposition of an intermediate layer between a substrate and a waveguiding layer is often necessary e.g. in order for contribution of the substrate's intrinsic fluorescence to be reduced for fluorescence measurements.

An optical waveguide with a substrate of plastic or a high organic portion and with an inorganic waveguiding layer, as well as methods for manufacture of this waveguide, are described in EP 533,074. Thermoplastically processable plastics, in particular polycarbonates, polymethylmethacrylates (PMMA) and polyesters, are preferred here.

Within this group of plastics, PMMA is known for having best optical properties, i.e. in particular poverty of fluorescence. A disadvantage of PMMA that has been described, however, is its low temperature stability, which does not permit continuous operating temperatures above 60° C. to 90° C., as required in some cases e.g. for nucleic acid-hybridization assays.

Less favorable physicochemical, especially optical, properties of known film waveguides comprising plastics as substrate (=essentially optically transparent layer (b)), contrasts with easier processability of these substances versus glass substrates, especially for producing a structured surface, e.g. through molding of a suitably structured master. Such molding processes for producing structured plastic surfaces generally cost less than a usual photolithographic surface structuring of glass substrates.

There is thus a need for optical waveguides, or general optical structures for generating an evanescent field measuring platform, which have similarly favorable optical properties, such as waveguides based on glass substrates, but which can be produced at lower cost.

Surprisingly it has now been found that, by using substrates of cyclo-olefin polymers (COP) or cyclo-olefin copolymers (COC), which are not mentioned in EP 533,074, it is possible to manufacture optical structures for generating evanescent-field measuring platforms and especially film waveguides, which are characterized by especially low intrinsic luminescence or fluorescence, with this being of great advantage in particular for fluorescence-based measuring methods, and which also show very low propagation losses of guided light. A new method was also surprisingly found for manufacturing film waveguides according to the invention by means of which these can be molded especially easily and in very good quality from a master.

Some favorable properties of optical components based on COP, compared with other plastics used in optics, which are listed in a product brochure of Nippon Zeon Co. Ltd., under the heading "Zeonex", include very low water absorption, high heat resistance, low content of impurities and relatively good chemical resistance.

In U.S. Pat. No. 6,063,886, various cyclo-olefin copolymers and components manufactured therefrom by injection molding are claimed, especially for optics. However, there are no references to their use for optical waveguides with associated highly specific requirements. Also no information at all is given to indicate possible molding processes for generation of three-dimensional structures of COC.

In U.S. Pat. No. 6,120,870, an optical "disk", based on COP, and a molding process for manufacturing this (structured) disk from a silicon master are described, wherein a resin layer between the master and a COP disk to be structured is used in each of specified variants of a molding process, with this layer being cured either photochemically, by UV light, or thermally.

In U.S. Pat. No. 5,910,287, microtiter plates ("multi-well plates") are described in which COC or COP is used as material for a floor of wells in order to reduce intrinsic fluorescence of such a plate for fluorescence-based tests. Manufacturing processes described include reaction injection molding (RIM) and liquid injection molding (LIM).

RIM (reaction injection molding) is a low-pressure mixing and injection process in which two or more liquid components are injected into a closed mold, where a plastic body is formed during rapid polymerization. Possible problems of an RIM process that have been described are in particular blister formation during a curing process, poor mold filling and difficult demoldability of a manufactured plastic body (H. Vollmer, W. Ehrfeld, P. Hagmann, "Untersuchungen zur Herstellung von galvanisierbaren Mikrostrukturen mit extremer Strukturhöhe durch Abformung mit Kunststoff im Vakuum-Reaktionsgiessverfahren", Report 4267 of the KfK, Karlsruhe, Germany, 1987; P. Hagmann, W. Ehrfeld, "Fabrication of Microstructures of extreme Structural Heights by Reaction Injection Molding", International Polymer Processing IV (1989) 3, pp. 188-195). Even if these problems are largely solved, a disadvantage of the RIM process which remains is a relatively long cycle time of several minutes (T. Bouillon, "Mikromechanik—Bedeutung und Anwendung von Mikrostrukturen aus Kunststoffen, Metallen und Keramik", study paper at the IKV, RWTH Aachen, cited in A. Rogalla, "Analyse des Spritzgiessens mikrostrukturierter Bauteile aus Thermoplasten", IKV Berichte aus der Kunststoffverarbeitung, Vol. 76, Verlag Mainz, Wissenschaftsverlag Aachen, Germany, 1998). An LIM process (liquid injection molding) is described as even more time-consuming, with typical cycle times of 5 to 10 minutes.

In contrast to the molding processes described above, a variotherm injection process (A. Rogalla, "Analyse des Spritzgiessens mikrostrukturierter Bauteile aus Thermoplasten", IKV Berichte aus der Kunststoffverarbeitung, Vol. 76, Verlag Mainz, Wissenschaftsverlag Aachen, Germany, 1998) is preferred for the process according to the invention in order to mold from a master of glass coated with a metal oxide, as part of a molding tool, and to manufacture a planar optical film waveguide. This purely physical process, based on liquefying at elevated temperature of plastic initially provided as pellets, enables plastic bodies to be manufactured with even very fine structures in very short cycle times (W. Michaeli, H. Greif, G. Kretzschmar, H. Kaufmann and R. Bertulait, "Technologie des Spritzgiessens", Carl Hanser Verlag Munich Vienna 1993, p. 69).

DETAILED DESCRIPTION OF THE INVENTION

A first subject of the invention is a method for manufacturing a body from a thermoplastic plastic with a three-dimensionally structured surface, wherein molding is performed directly from a master made of glass coated with metal oxide, without deposition of further coatings on a surface of the master.

This molding method according to the invention offers a number of advantages over known processes for molding from coated, e.g. galvanized, masters, for example from so-called nickel shims. In particular, materials to be molded from, according to the invention, i.e. glass coated with metal oxide, are harder and more scratch-resistant, thus allowing a larger number of moldings to be manufactured from one and the same master. Moreover, additional process steps, such as deposition of an additional coating, are avoided when preparing the master. This not only simplifies preparation of the master, but also avoids a risk of generating additional defects on the master as a result of additional processing steps that are otherwise needed. Thus, the master is prepared without depositing further coatings prior to molding.

It is preferred if the metal oxide of the master is a material from a group of materials comprising $TiO_2$, $ZnO$, $Nb_2O_5$, $Ta_2O_5$, $HfO_2$, or $ZrO_2$, with particular preference being for $TiO_2$, $Ta_2O_5$ or $Nb_2O_5$.

The master itself may be manufactured using standard methods for microstructuring, such as photolithograpy, laser ablation, electron beam or ion beam processing.

Thereby, the process is characterized in that three-dimensional structures measuring 1-1000 nm and 1 µm to 1000 µm are enabled of being molded in a single molding step. In particular, if very small and also relatively large structures are molded at the same time, requirements regarding surface quality of the master are of course very high. A higher cost in manufacture of the master, however, is more than offset by saving of a second process step for a molded product which would otherwise be needed.

Furthermore, the method according to the invention allows extended bodies with a three-dimensionally structured surface of more than 1 $cm^2$, preferably of more than 10 $cm^2$, especially preferably of more than 100 $cm^2$, to be molded in a single step. For example, bodies of a size of a standard microtiter plate, with surface structures of nanometer orders of magnitude, can be molded simultaneously.

Molding based on the method according to the invention may be performed using all known processes (such as RIM, LIM and the like) which are compatible with properties of the master (e.g. in respect of resistance to high temperatures or pressures). For manufacture of a small product series, hot embossing of plastics is often used. Accordingly, it is preferred if molding is performed using a method from a group of processes comprising injection molding, reaction injection molding (RIM), liquid injection molding (LIM) and hot embossing.

Molding by use of an injection molding process is especially preferred, and a variotherm injection molding process is most particularly preferred.

It is preferred moreover if a molding material used in the method according to the invention for production of a body with a three-dimensionally structured surface includes a material from a group comprising polycarbonates, polymethylmethacrylates, cyclo-olefin polymers and cyclo-olefin copolymers, where a group formed by cyclo-olefin polymers and cyclo-olefin copolymers is especially preferred.

Suitable cyclo-olefins are described in U.S. Pat. Nos. 5,278,238 (B. L. Lee et al.), 4,874,808 (Minami et al.), 4,918,133 (Moriya et al.), 4,935,475 (Kishiinura et al.), 4,948,856 (Minchak et al.), 5,115,052 (Wamura et al.), 5,206,306 (Shen), 5,270,393 (Sagane et al.), 5,272,235 (Wakatsuru et al.), 5,278,214 (Moriya et al.), 5,534,606 (Bennett et al.), 5,532,030 (Hirose et al.), 4,689,380 (Hirose et al.), 4,689,380 (Nahm et al.) and 4,899,005 (Lane et al.). Cyclo-olefins (e.g. cyclopentene, cyclohexene and cycloheptene) and polyethylene copolymers thereof are preferred, as are corresponding thermoplastic olefin polymers of amorphous structure (TOPAS line) from Hoechst (Germany). Of these, plastics TOPAS 8007, 5013, 6013, 6015 and 6017 are especially preferred. Cyclo-olefin polymers sold by the company Nippon Zeon Co., Japan, under the product name ZEONEX (e.g. polymers 480, 480R, E48R and 490K) and ZEONOR (polymers 1020R, 1060R, 1420R, 1600R) are also preferred.

A subject of the invention is in particular a method for manufacture of a planar optical structure for generating an evanescent-field measuring platform, wherein the evanescent-field measuring platform comprises a multilayer system, with a metal layer (a') or an essentially optically transparent, waveguiding layer (a) with refractive index $n_1$ and at least a second, essentially optically transparent layer (b) with refractive index $n_2$, where $n_1 > n_2$, and where the second layer (b) comprises a thermoplastic plastic and is molded directly from a master made of glass coated with a metal oxide, as part of a molding tool, without deposition of further coatings on a surface of the master.

A preferred variant here is a method for manufacture of a planar optical structure for generating an evanescent-field measuring platform, wherein the evanescent-field measuring platform is a planar optical structure for generating a surface plasmon resonance. The metal layer of this optical structure preferably comprises gold or silver. Especially suitable in this case are layer thicknesses between 40 nm and 200 nm, with thicknesses between 40 nm and 100 nm being especially preferred. It is an advantage if material of layer (b) or of an optional additional dielectric layer (buffer layer) which is in contact with the metal layer has a low refractive index $n<1.5$, especially preferably $n<1.35$.

In another, especially preferred variant, a manufacturing process according to the invention is a method for manufacture of a planar optical waveguide, comprising a first essentially optically transparent, waveguiding layer (a) with refractive index $n_1$ and a second essentially optically transparent layer (b) with refractive index $n_2$, where $n_1 > n_2$, and where the second layer (b) of the waveguide comprises a thermoplastic plastic and is molded directly from a master made of glass coated with a metal oxide, as part of a molding tool, without deposition of further coatings on a surface of the master.

The term "planar" is understood to mean here that, apart from surface roughness or structuring for light in-coupling or out-coupling and, where applicable, recesses structured in a surface of the waveguide for creation of sample compartments, a radius of curvature of the surface of the waveguide both parallel with and perpendicular to a direction of propagation of light during waveguiding is at least 1 cm, preferably at least 5 cm.

The term "essentially optically transparent" is understood to mean that a layer thus characterized is a minimum of 95% transparent at least at a wavelength of light delivered from an external light source for its optical path perpendicular to the layer, provided the layer is not reflecting. In a case of partially reflecting layers, "essentially optically transparent" is understood to mean that a sum of transmitted and reflected light and, if applicable, light in-coupled into a layer and guided therein amounts to a minimum of 95% of delivered light at a point of incidence of the delivered light.

For the method according to the invention for manufacture of a planar optical structure for generating an evanescent-field measuring platform and, in particular also for generating a planar optical film waveguide, the same preferences apply as those stipulated above in general for the method for manufacturing a body made of a thermoplastic plastic with a three-dimensionally structured surface.

The process comprises grating structures (c) or (c') located on the surface of the master and formed as relief gratings being transferred to a surface of layer (b) during a molding step. This thus means that the grating structures (c) and/or (c') formed as relief gratings are generated in a surface of layer (b) by molding from a master with surface relief gratings complementary to grating structures (c) and/or (c'), respectively.

The manufacturing process according to the invention also allows raised areas formed on the surface of the master to be formed during the molding step as recesses in layer (b). The recesses in layer (b) preferably have a thickness of 20 µm to 500 µm, preferably 50 µm to 300 µm.

In particular, it is characteristic for the manufacturing process according to the invention that grating structures (c) and/or (c') as relief gratings with a depth of 3 nm to 100 nm, preferably of 10 nm to 30 nm, and recesses with a depth of 20 µm to 500 µm, preferably of 50 µm to 300 µm, can be molded simultaneously in a single step.

It is preferred if material used in the process according to the invention for generating the essentially transparent layer (b) of the planar optical structure for generating an evanescent-field measuring platform includes a material from a group comprising polycarbonates, polymethylmethacrylates, cyclo-olefin polymers and cyclo-olefin copolymers. Especially preferred is a material from a group formed by cyclo-olefin polymers and cyclo-olefin copolymers.

A further subject of the invention is a body made of a thermoplastic plastic with a three-dimensionally structured surface wherein molding of the structured surface is performed directly from a master made of glass coated with metal oxide, without deposition of further coatings on a surface of the master, in a manufacturing process according to the invention as defined in one of the embodiments.

A molded surface of the body may have structures with dimensions of 1 nm-1000 nm or also of 1 µm-1000 µm. In particular, the molded surface may comprise structures with dimensions of 1 nm-1000 nm and of 1 µm to 1000 µm, which are molded in a single step.

The body according to the invention may have an extended three-dimensionally structured surface of more than 1 cm$^2$, preferably of more than 10 cm$^2$, especially preferably of more than 100 cm$^2$, which is molded in a single step.

It is preferred if molding of the body is performed using a method from a group of processes comprising injection molding, reaction injection molding (RIM), liquid injection molding (LIM) and hot embossing. Especially preferred is an injection molding process, most especially preferred is a variotherm injection molding process.

It is further preferred if molding material used in the process according to the invention, for producing a body with a three-dimensionally structured surface, includes a material from a group comprising polycarbonates, polymethylmethacrylates, cyclo-olefin polymers and cyclo-olefin copolymers. In this case, a material from a group comprising cyclo-olefin polymers and cyclo-olefin copolymers is especially preferred.

A subject of the invention is also a planar optical structure for generating an evanescent-field measuring platform, wherein the evanescent-field measuring platform comprises a multilayer system, with a metal layer and/or an essentially optically transparent waveguiding layer (a) with refractive index $n_1$ and at least a second, essentially optically transparent layer (b) with refractive index $n_2$, where $n_1 > n_2$, and where the second layer (b) comprises a thermoplastic plastic and is molded directly from a master made of glass coated with a metal oxide, as part of a molding tool, without deposition of further coatings on a surface of the master, in a manufacturing method according to the invention as described in one of the embodiments.

In a preferred variant of a planar optical structure according to the invention for generating an evanescent-field measuring platform, this is a planar optical structure for generating a surface plasmon resonance. This planar optical structure preferably comprises a metal layer of gold or silver.

Especially preferred, thereby, are metal layer thicknesses between 40 nm and 200 nm, with thicknesses between 40 nm and 100 nm being especially preferred. It is an advantage if a material of layer (b) or of an optional additional dielectric layer (buffer layer) which is in contact with the metal layer has a low refractive index $n<1.5$, especially preferably $n<1.35$.

In another, especially preferred embodiment of a planar optical structure according to the invention for generating an evanescent-field measuring platform, the structure is a planar optical film waveguide, comprising a first essentially optically transparent, waveguiding layer (a) with refractive index $n_1$ and a second essentially optically transparent layer (b) with refractive index $n_2$, where $n_1 > n_2$, and where the second layer (b) of the film waveguide comprises a thermoplastic plastic and is molded directly from a master made of glass coated with metal oxide, as part of a molding tool, without deposition of further coatings on a surface of the master, in a manufacturing method according to the invention as described in one of the embodiments.

It is characteristic for the planar optical structure according to the invention for generating an evanescent-field measuring platform that grating structures (c) or (c') located on the surface of the master and formed as relief gratings are transferred to a surface of layer (b) during a molding step. This means in particular that the grating structures (c) and/or (c') formed as relief gratings are generated in a surface of layer (b) by molding from a master with surface relief gratings complementary to grating structures (c) and/or (c''), respectively.

A characteristic of a special embodiment of the planar optical structure for generating an evanescent-field measuring platform according to the invention is that raised areas formed on the surface of the master are molded as recesses in layer (b) during the molding step. The recesses in layer (b) preferably have a depth of 20 µm to 500 µm, especially preferably 50 µm to 300 µm.

It is also preferred if the planar optical structure according to the invention for generating an evanescent-field measuring platform has an extended three-dimensionally structured surface of more than 1 cm$^2$, preferably of more than 10 cm$^2$, especially preferably of more than 100 cm$^2$, which is molded in a single molding step.

The essentially optically transparent layer (b) of a planar optical structure according to the invention for generating an evanescent-field measuring platform may be molded using a method from the group of processes comprising injection molding, reaction injection molding (RIM), liquid injection molding (LIM) and hot embossing. Molding is preferably performed using an injection molding process, especially preferably using a variotherm injection molding process.

It is an advantage if material of the second essentially optically transparent layer (b) of the planar optical structure according to the invention for generating an evanescent-field measuring platform, as used in the manufacturing process according to the invention, comprises a material from a group comprising polycarbonates, polymethylmethacrylates, cyclo-olefin polymers and cyclo-olefin copolymers, with material from a group comprising cyclo-olefin polymers and cyclo-olefin copolymers being especially preferred.

Planar optical structures from multilayer systems, for generating an evanescent-field measuring platform, and especially planar optical film waveguides with an essentially optically transparent layer (b) of cyclo-olefin polymers or cyclo-olefin copolymers are not known in the prior art, as stated hereinbefore.

A further subject of the invention is therefore, regardless also of the manufacturing process, a planar optical structure for generating an evanescent-field measuring platform, wherein the evanescent-field measuring platform comprises a multilayer system, with a metal layer and/or an essentially optically transparent, waveguiding layer (a) with refractive index $n_1$ and at least a second, essentially optically transparent layer (b) with refractive index $n_2$, where $n_1 > n_2$, and where the second layer (b) consists of a thermoplastic plastic and comprises a material from a group comprising cyclo-olefin polymers and cyclo-olefin copolymers.

In a preferred embodiment, this structure is a planar optical structure for generating a surface plasmon resonance. This planar optical structure preferably comprises a metal layer of gold or silver.

Another preferred embodiment of a planar optical structure according to the invention for generating an evanescent-field measuring platform characterized in that the evanescent-field measuring platform is a planar optical film waveguide, comprises a first essentially optically transparent waveguiding layer (a) with refractive index $n_1$ and a second essentially optically transparent layer (b) with refractive index $n_2$, where $n_1 > n_2$, and where the second layer (b) of the film waveguide comprises a material from a group formed by cyclo-olefin polymers and cyclo-olefin copolymers.

It is further preferred if a refractive index of the first optically transparent layer (a) is greater than 1.8. Numerous materials are suitable for optical layer (a). Without loss of generality, it is preferred if the first optically transparent layer (a) is a material from a group comprising $TiO_2$, $ZnO$, $Nb_2O_5$, $Ta_2O_5$, $HfO_2$, or $ZrO_2$, with special preference being for $TiO_2$ or $Nb_2O_5$ or $Ta_2O_5$.

Light delivered from an external light source in a direction of layer (a) (or layer (a'), respectively), i.e. both light irradiated through layer (b) in the direction of layer (a) (or the metal layer, respectively) and also light irradiated from an opposite side, if necessary through a medium located above layer (a) (or the metal layer, respectively), in the direction of layer (a) (or the metal layer, respectively), shall be called generally according to the present invention an "excitation light". This excitation light may serve both for excitation of luminescence, or, more specifically, fluorescence or phosphorescence, and also for Raman radiation of molecules adjacent to layer (a) (or to the metal layer, respectively) or also for in-coupling into layer (a), for determination of actual coupling parameters, such as an in-coupling angle, or for excitation of a surface plasmon in a metal layer, for determination of a resonance angle for surface plasmon resonance, or also other parameters, such as a phase difference of light, between a split beam of excitation light passing through a region provided on layer (a) for detection of at least one analyte and another split beam passing through a referencing region, in an interferometric measurement arrangement.

It is also preferred if the waveguiding layer (a) of a planar optical film waveguide according to the invention, as a preferred embodiment of a planar optical structure according to the invention for generating an evanescent-field measuring platform, is in optical contact with at least one optical coupling element for in-coupling of excitation light of at least one wavelength from at least one light source into layer (a).

Several methods are known for coupling excitation light into a planar waveguide. Earliest methods used were based on butt-end coupling or prism coupling, wherein generally a liquid is introduced between a prism and a waveguide to reduce reflections resulting from air gaps. These two methods are mainly suitable in combination with waveguides having relatively large layer thickness—i.e. especially self-supporting waveguides—and a refractive index significantly below 2. By contrast, for coupling of excitation light into very thin waveguiding layers of high refractive index, use of coupling gratings is a substantially more elegant method.

It is preferred if, for in-coupling of excitation light into the optically transparent layer (a), this layer is in optical contact with at least one optical in-coupling element from a group comprising prism couplers, evanescent couplers with combined optical waveguides with overlapping evanescent fields, butt-end couplers with focusing lenses, preferably cylinder lenses, arranged in front of one face of a waveguiding layer, and grating couplers.

It is especially preferred if the excitation light is in-coupled into the optically transparent layer (a) using at least one grating structure (c) which is featured in the optically transparent layer (a).

Out-coupling of light guided in layer (a) may in principle take place via the same kind of optical coupling elements as those named hereinbefore for in-coupling. It is preferred if light guided in optically transparent layer (a) is out-coupled using grating structures (c'), which are featured in the optically transparent layer (a).

Grating structures (c) and (c') featured in the optically transparent layer (a) may have the same or different periods and be arranged parallel or not parallel with each other. In general, grating structures (c) and (c') can be used alternately as in-coupling and/or out-coupling gratings.

Apart from the refractive index of the waveguiding optically transparent layer (a), a thickness thereof is a second decisive parameter for generating both a strongest possible evanescent field at interfaces with adjacent layers which have a lower refractive index, and a highest possible energy density within layer (a). Thereby, intensity of the evanescent field increases with decreasing thickness of the waveguiding layer (a) as long as the thickness of the layer is sufficient to guide at least one mode of an excitation wavelength. Thereby, a minimum "cut-off" thickness for guiding a mode is dependent on a wavelength of light to be guided. It is greater for longer wavelength light than for short wavelength light. As the layer thickness approaches this "cut-off" point, however, adverse propagation losses also show a marked increase, which additionally exerts a downward limit on a preferred layer thickness. Preference is for thicknesses of optically transparent layer (a) which allow only 1 to 3 modes of a specified excitation wavelength to be guided, with very particular preference being for layer thicknesses which lead to monomodal waveguides for this excitation wavelength. It is clear in this case that a discrete modal character of guided light only relates to transversal modes.

These requirements lead to a product from the thickness of layer (a) and its refractive index advantageously amounting to one-tenth to one whole, preferably one-third to two-thirds, of a wavelength of an excitation light in-coupled into layer (a).

It is also preferred if the grating structures (c) and/or (c') are relief gratings with a grating structure depth of 3 to 100 nm, especially preferably of 10 to 30 nm. It is an advantage if a ratio of modulation depth to thickness of the first optically transparent layer (a) is equal to or less than 0.2.

A level of propagation losses of a mode guided in an optically waveguiding layer (a) is determined to a large extent by surface roughness of an underlying carrier layer and by absorption through chromophores that may be present in this carrier layer, which in addition carries a risk that luminescence, which is unwanted for many applications, may be excited in this carrier layer through penetration of an evanescent field of a mode guided in layer (a). Thermal tension may also occur owing to different thermal expansion coefficients of the optically transparent layers (a) and (b). It may therefore be an advantage if an additional optically transparent layer (b') with a lower refractive index than that of layer (a), and with a thickness of 5 nm-10,000 nm, preferably 10 nm-1000 nm, is located between the optically transparent layers (a) and (b) and is in contact with layer (a). This intermediate layer has a function of reducing surface roughness below layer (a) or reducing penetration of an evanescent field of light guided in layer (a) into at least one underlying layer, or improving adhesion of layer (a) on the at least one underlying layer, or reducing thermally induced tension within a film waveguide, or chemically isolating the optically transparent layer (a) from underlying layers by virtue of sealing micropores in layer (a) against underlying layers.

The following preferences apply in turn not only for a planar optical film waveguide according to the invention, but also for a more general subject of the invention of a planar optical structure, comprising a multilayer system, for generating an evanescent-field measuring platform.

Special embodiments of the planar optical structure according to the invention for generating an evanescent-field measuring platform comprise large-area grating structures (c) and/or (c') that cover extensive surface areas of the optical structure, preferably an entire surface area thereof. The planar optical structure according to the invention for generating an evanescent-field measuring platform may also feature multiple grating structures (c) and/or (c') on a common, continuous substrate in the essentially optically transparent layer (a) and/or the metal layer.

For example, for in-coupling of excitation light of different wavelengths, such an embodiment may be advantageous which comprises a superposition of at least two grating structures of differing periodicity with grating lines arranged parallel or not parallel with one another.

A characteristic for another preferred embodiment is at least one grating structure (c) and/or (c') which shows a three-dimensionally varying periodicity that is essentially perpendicular to a direction of propagation of excitation light in-coupled into the optically transparent layer (a) or of surface plasmon resonance generated in the metal layer. Such special embodiments, for example of optical waveguides, are described in WO 92/19976 and in WO 98/09156, where they are also termed "integrated-optical light pointers". An advantage of this embodiment of a grating coupler is based on the fact that an outer variable of a resonance angle for in-coupling an excitation light delivered to in-coupling grating from outside is converted into a local variable on grating-waveguide structure, i.e. into a determination of a position on this structure, on which a resonance condition is met based on a suitable period of this coupling grating.

For manufacture of multi-diffractive grating structures or of grating structures with three-dimensionally variable periodicity or other complex grating structures in the waveguiding layer (a) (or the metal layer, respectively) in relatively large quantities, principally planar optical structures with plastic substrates (as essentially optically transparent layer (b)) are more suitable than such with glass substrates, because a manufacturing process of such complex grating structures is extremely tedious. It may for example be performed using multiple exposure by photolithographic structure, or by structuring using an electron beam process. Accordingly, manufacture of a master, for example with a glass substrate, is very costly. From such a master, however, it is then possible to mold almost as many copies as one wishes of planar optical structures based on plastic substrates.

For most applications, it is desirable to in-couple excitation light from a spectrum between near-UV and near-IR, i.e. predominantly from a visible spectrum. For this it is an advantage if the grating structures (c) and if applicable also any additional grating structures (c') that are present, show a period of 200 nm-1000 nm.

For most applications, it is further desirable if coupling conditions are very precisely defined over areas as large as possible and change as little as possible. It is therefore preferred for these applications if a resonance angle for in-coupling and out-coupling of a monochromatic excitation light or for excitation of a surface plasmon does not vary by more than 0.1° (as deviation from a mean value) within an area of a grating structure of at least 4 mm$^2$ (with sides arranged parallel or not parallel with lines of the grating structure (c)) or over a distance of at least 2 mm parallel with the lines.

The grating structures (c) and/or (c') may be relief gratings with any profile, for example a rectangular, triangular or semicircular profile.

Preferred embodiments of the planar optical structure according to the invention for generating an evanescent-field measuring platform comprise the grating structures (c) and/or (c') being formed as a relief grating in the surface of layer (b) facing layer (a) or the metal layer, and being transmitted in the manufacturing process of the waveguide at least to the surface (layer interface) of layer (a) or the metal layer facing layer (b). Relief gratings formed in the surface of layer (b) facing layers to be deposited later, layer (a) or the metal layer, are transmitted to surfaces of not only one, but of several layers when they are deposited on layer (b).

For analytical applications, a general preference is for embodiments of a planar optical film waveguide according to the invention which comprise biological or biochemical or synthetic recognition elements being deposited on the surface of layer (a) or the metal layer, respectively, or on an adhesion-promoting layer additionally deposited on layer (a) or the metal layer for qualitative and/or quantitative detection of at least one analyte in at least one sample brought into contact with the recognition elements.

There are numerous methods for depositing the biological or biochemical or synthetic recognition elements on the optically transparent layer (a) or metal layer. For example, this may take place through physical adsorption or electrostatic interaction. Orientation of the recognition elements is then generally statistical. There is also a risk that, if there is a difference in composition of a sample containing an analyte or reagents used in a detection method, some of immobilized recognition elements will be washed away. It may therefore be an advantage if, for immobilization of biological or biochemical or synthetic recognition elements (e), an adhesion-promoting layer (f) is deposited on the optically transparent layer (a) or the metal layer. This adhesion-promoting layer should be essentially optically transparent. In particular, the adhesion-promoting layer should not jut out from waveguiding layer (a) or the metal layer beyond a penetration depth of the evanescent field into medium above. The adhesion-promoting layer (f) should therefore have a thickness of less than 200 nm, preferably of less than 20 nm. This layer may comprise, for example, chemical compounds from a group of silanes, functionalized silanes, epoxides, functionalized, charged or polar polymers, thiols, dextrans and "self-assembled passive or functionalized monolayers or multilayers".

To enable simultaneous detection of multiple and generally different analytes, it is preferred if the biological or biochemical or synthetic recognition elements are immobilized in discrete (spatially separated) measurement areas.

Within a meaning of the present invention, discrete (spatially separated) measurement areas shall be defined by an area which take up biological or biochemical or synthetic recognition elements immobilized there for recognition of at least one analyte in a liquid sample. These areas may be present in any geometric form, for example in the form of points, circles, rectangles, triangles, ellipses or stripes. Thereby, it is possible in this case to generate spatially separated measurement areas by spatially selective deposition of biological or biochemical or synthetic recognition elements on the optical film waveguide (either directly on the waveguiding layer (a) or the metal layer, respectively, or on an adhesion-promoting layer deposited on layer (a) or the metal layer, respectively). In contact with an analyte or an analog of the analyte that competes with the analyte for binding to immobilized recognition elements or a further binding partner in a multistep assay, these molecules bind only selectively to a surface of the planar optical structure in the measurement areas, which are defined by areas which are occupied by the immobilized recognition elements. It is possible that, in a 2-dimensional arrangement, up to 1,000,000 measurement areas may be arranged on a planar optical structure according to the invention for generating an evanescent-field measuring platform, where a single measurement area for example may occupy an area of $0.001 \text{ mm}^2 - 6 \text{ mm}^2$. Typically, a density of measurement areas may be more than 10, preferably more than 100, especially preferably more than 1000 measurement areas per square centimeter on the surface of layer (a) or the metal layer, respectively, or on an adhesion-promoting layer additionally deposited on layer (a) or the metal layer, respectively.

For spatially selective deposition of the biological or biochemical or synthetic recognition elements, at least one method may be used from a group of methods comprising "ink jet spotting", mechanical spotting by use of a pin, pen or capillary, "micro contact printing", fluidic contact of measurement areas with the biological or biochemical or synthetic recognition elements through their application parallel to or intersecting microchannels, upon exposure to pressure differences or to electric or electromagnetic potentials, and photochemical or photolithographic immobilization methods.

For industrial use of a planar optical structure according to the invention for generating an evanescent-field measuring platform, it is an advantage if established laboratory robots can be used for deposition of the recognition elements and/or samples. This possibility is given if dimensions of the optical structure are compatible with dimensions of industrial standard microtiter plates. Such plates with 96 wells (recesses as sample compartments) spaced at about 9 mm, 384 wells spaced at about 4.5 mm or 1536 wells spaced at about 2.25 mm are commercially available. It is therefore preferred if outer measurements of a bottom surface of a planar optical structure according to the invention for generating an evanescent-field measuring platform match a footprint of standard microtiter plates of about 8 cm×12 cm (with 96 or 384 or 1536 wells).

The fact that a substrate (essentially optically transparent layer (b)) of a planar optical structure according to the invention for generating an evanescent-field measuring platform can be structured by molding from a suitable master creates a possibility of also structuring recesses in this substrate at the same time, before subsequent deposition of the waveguiding layer (a) or the metal layer, with molding of grating structures (c) or (c') for generating sample compartments in which, after deposition of further layers, discrete (spatially separated) measurement areas are then created with the recognition elements immobilized therein. A preferred embodiment of a planar optical structure according to the invention for generating an evanescent-field measuring platform therefore comprises recesses being structured in layer (b) to create sample compartments. These recesses preferably have a depth of 20 µm to 500 µm, especially preferably 50 µm to 300 µm.

It is also an advantage if the planar optical structure for generating an evanescent-field measuring platform comprises mechanically and/or optically recognizable markings to facilitate their adjustment in an optical system and/or to facilitate a combination of the planar optical structure with a further body for creation of at least one sample compartment.

As biological or biochemical or synthetic recognition elements, components may be applied from a group formed from nucleic acids (for example DNA, RNA, oligonucleotides) and nucleic acid analogs (e.g. PNA) and derivatives thereof with synthetic bases, monoclonal or polyclonal antibodies and antibody fragments, peptides, enzymes, aptamers, synthetic peptide structures, glycopeptides, oligosaccharides, lectins, soluble, membrane-bound proteins and proteins isolated from a membrane such as receptors, ligands thereof, antigens for antibodies (e.g. biotin for streptavidin), "histidine tag components" and complexing partners thereof, and cavities created by chemical synthesis for accommodating molecular imprints, and the like.

The last-named type of recognition elements are understood to mean cavities which are manufactured in a process that has been described in literature as "molecular imprinting". To this end, an analyte or an analog of the analyte is encapsulated in a polymer structure, usually in organic solution. This is then described as an "imprint". The analyte or the analog thereof is then removed again from the polymer structure with addition of suitable reagents, so that it leaves behind an empty cavity. This empty cavity can then be used as a binding site with high steric selectivity in a later detection method.

It is also possible that whole cells or cell fragments may be deposited as biochemical or biological recognition elements.

In many cases, a limit of detection of an analytical method is limited by signals of so-called nonspecific binding, i.e. by signals that are generated by binding of an analyte or other compounds used for detection of the analyte, which are bound, for example through hydrophobic adsorption or electrostatic interactions, not only in a region of immobilized biological or biochemical or synthetic recognition elements used, but also in areas on a surface of a planar optical structure that are not covered by these elements. It is therefore an advantage if areas between discrete measurement areas are "passivated" to minimize nonspecific binding of analytes or their tracer substances, i.e. if compounds "chemically neutral" to the analyte or one of its tracer substances are deposited between the discrete measurement areas. "Chemically neutral" compounds are understood to be those substances which do not themselves show any specific binding sites for recognition and binding of the analyte or an analog thereof or a further binding partner in a multistep assay and which, through their presence, block access of the analyte or its analog or the further binding partners to a surface of the film waveguide.

"Chemically neutral" compounds which may be used, for example, are substances from groups comprising albumins, especially bovine serum albumin or human serum albumin, casein, nonspecific, polyclonal or monoclonal, heterologous or for an analyte or analytes to be determined empirically nonspecific antibodies (especially for immunoassays), detergents (such as Tween 20), fragmented natural or synthetic DNA not hybridizing with polynucleotides for analysis, such as a herring or salmon sperm extract (especially for polynucleotide hybridization assays), or also uncharged, but hydrophilic polymers, such as polyethylene glycols or dextrans.

Especially selection of these substances for reducing non-specific hybridization in polynucleotide hybridization assays (such as extracts of herring or salmon sperm) is determined here by empirical preference for DNA which is "heterologous" for polynucleotides to be analyzed, about which no interactions with polynucleotide sequences to be detected are known.

A further subject of the invention is an analytical system with a planar optical structure for generating an evanescent-field measuring platform, with biological or biochemical or synthetic recognition elements immobilized on surface of layer (a) or a metal layer, respectively, or on an adhesion-promoting layer additionally deposited on layer (a) or the metal layer, respectively, for qualitative and/or quantitative detection of at least one analyte in at least one sample brought into contact with the recognition elements, wherein an upper side of the planar optical structure with measurement areas over the optically transparent layer (a) or the metal layer created thereon is combined with a further body such that between the planar optical structure as a baseplate and the body at least one cavity is formed for creation of at least one sample compartment, fluidically sealed against one other, in each of which are located at least one measurement area or segment or array of measurement areas.

A one-dimensional or two-dimensional arrangement of measurement areas which together are brought into contact with the same sample shall be described here as an array of measurement areas. Within a sample compartment, there may be one or also more arrays of measurement arrays. An arrangement of at least two measurement areas to which a common function is assigned based on selection of recognition elements immobilized therein, for example for referencing or for calibration or for detection of identical analytes, shall be described as a segment of measurement areas. Segments of measurement areas may be parts of an array of measurement areas.

A preferred embodiment of an analytical system according to the invention comprises sample compartments being formed as flow cells fluidically sealed against one another with at least one inlet and at least one outlet in each case, and optionally at least one outlet of each flow cell in addition leading to a reservoir fluidically connected to this flow cell to receive fluid exiting the flow cell.

Another possible embodiment comprises sample compartments being open on that side of a body combined with a planar optical structure as a baseplate which lies opposite measurement areas.

An arrangement of sample compartments of an analytical system according to the invention may comprise 2-2000, preferably 2-400, especially preferably 2-100 individual sample compartments. Thereby, it is preferred if a pitch (geometrical arrangement in rows and/or columns) of the sample compartments matches a pitch of wells of a standard microtiter plate. The sample compartments may have the same or different capacities of 0.1 nl-100 µl in each case.

The analytical system according to the invention preferably also comprises supply facilities for bringing the at least one sample into contact with immobilized biological or biochemical or synthetic recognition elements.

Such embodiments of an analytical system according to the invention preferably comprise in addition at least one excitation light source for delivery of at least one excitation light beam to a planar optical structure for generating an evanescent-field measuring platform, according to one of the afore-mentioned embodiments, and at least one detector for detecting light emanating from the optical structure.

Various methods can be distinguished for analyte detection in an evanescent field of guided light waves in optical film waveguides or in an evanescent field of surface plasmons generated in metal films. On basis of a measurement principle used, for example, a distinction can be drawn between fluorescence or, more generally, luminescence methods on the one hand and refractive methods on the other. Methods for generating a surface plasmon resonance in a thin metal layer on a dielectric layer with lower refractive index can be included here in a group of refractive methods, provided a resonance angle of delivered excitation light for generating surface plasmon resonance is used as a basis for determining a parameter. The surface plasmon resonance may also be used, however, to intensify a luminescence or to improve a signal-to-background ratio in a luminescence measurement. Conditions for generating a surface plasmon resonance and for combination with luminescence measurements, as well as with waveguiding structures, are widely described in literature, for example in U.S. Pat. Nos. 5,478,755, 5,841,143, 5,006,716 and 4,649,280.

In this application, the term "luminescence" describes spontaneous emission of photons in a range from ultraviolet to infrared, after optical or non-optical excitation, such as electrical or chemical or biochemical or thermal excitation. For example, chemiluminescence, bioluminescence, electroluminescence, and especially fluorescence and phosphorescence are included under the term "luminescence".

In refractive methods of measurement, a change in the so-called effective refractive index resulting from molecular adsorption or desorption on a waveguide is used for detection of the analyte. This change in the effective refractive index, in a case of grating coupler sensors, is determined for example from a change in a coupling angle for in-coupling or out-coupling of light into or out of a grating coupler sensor, and in a case of interferometric sensors it is determined from a change in a phase difference between measuring light guided in a sensor arm and a reference arm of an interferometer. In a case of surface plasmon resonance, for example, a corresponding change in the resonance angle for generating a surface plasmon is measured. Provided an excitation light source used is tunable over a certain spectral range, changes in an excitation wavelength at which in-coupling into a grating coupler sensor or excitation of a surface plasmon occur can also be measured, instead of change in the coupling or resonance angle, respectively, with a fixed angle of incidence. The refractive methods mentioned have an advantage in that they can be employed without use of additional marker molecules, so-called molecular labels. However, they are generally less sensitive than detection methods which are based on determination of luminescence excited in an evanescent field of a waveguide.

In a case of refractive measurement techniques, detection of measurement light typically takes place at a wavelength of excitation light. A characteristic of embodiments of the analytical system according to the invention which are particularly suitable for refractive methods of detection is therefore that detection of light at a wavelength of irradiated excitation light and emanating from a planar optical structure, for generating an evanescent-field measuring platform as part of the analytical system, is performed.

For known arrangements of grating coupler sensors (see e.g.: K. Tiefenthaler, W. Lukosz, "Sensitivity of grating couplers as integrated-optical chemical sensors", J. Opt. Soc. Am. B6, 209 (1989); W. Lukosz, Ph. M. Nellen, Ch. Stamm, P. Weiss, "Output Grating Couplers on Planar Waveguides as Integrated, Optical Chemical Sensors", Sensors and Actuators B1, 585 (1990), and in T. Tamir, S. T. Peng, "Analysis and Design of Grating Couplers", Appl. Phys. 14, 235-254 (1977)) a locally resolved measurement is not possible. PCT/EP 01/00605 contains a description of a grating-waveguide structure which enables changes in resonance conditions for in-coupling of excitation light into waveguiding layer (a) of an optical film waveguide via a grating structure (c) modulated in layer (a), or for out-coupling of light guided in layer (a), with arrays of measurement areas generated thereon, each with different immobilized biological or biochemical or synthetic recognition elements for simultaneous binding and detection of at least one analyte, to be measured in a locally resolved manner, where excitation light is delivered at the same time to an entire array of measurement areas, and a degree of fulfillment of a resonance condition for in-coupling of light into layer (a) towards the measurement areas is measured at the same time. Planar optical structures on which the present invention is based for generating an evanescent-field measuring arrangement, especially in the embodiment of planar optical film waveguides, are suitable for such imaging refractive methods of measurement. Embodiments of planar film waveguides described in PCT/EP 01/00605, as grating-waveguide structures, as well as likewise described optical systems, as an integral part of corresponding embodiments of analytical systems according to the invention, as well as methods based on use thereof for detection of at least one analyte, are therefore likewise a subject of the present invention.

Other embodiments of an analytical system according to the invention are characterized in that detection of light emanating from the planar optical structure is performed at a wavelength other than that of incident excitation light. It is preferred if detection of light emanating from the planar optical structure is performed at a wavelength of a luminescence excited by the excitation light. Thereby, a wavelength of detected luminescence is generally shifted to wavelengths longer than that of the incident excitation light.

For the in-coupling of excitation light into optically transparent layer (a) of a planar optical film waveguide, an analytical system according to the invention may comprise at least one optical in-coupling element from a group comprising prism couplers, evanescent couplers with combined optical waveguides with overlapping evanescent fields, butt-end couplers with focusing lenses, preferably cylinder lenses, arranged in front of one face of a waveguiding layer, and grating couplers. It is preferred if excitation light is in-coupled into the optically transparent layer (a) using at least one grating structure (c) featured in the optically transparent layer (a), where the excitation light is delivered to the at least one grating structure featured in layer (a) under an angular range which comprises a resonance angle for in-coupling into layer (a) via the at least one grating structure. Accordingly, to meet resonance conditions for generating a surface plasmon in a metal layer of a planar optical structure according to the invention, it is preferred if excitation of the surface plasmon resonance takes place using at least one grating structure (c) featured in the metal layer, where the excitation light is delivered to the at least one grating structure featured in the metal layer under an angular range which comprises the resonance angle.

In this case, it is preferable if an incident excitation light in each case is essentially parallel and monochromatic and is delivered to the at least one grating structure featured in layer (a) or (a') under the resonance angle for in-coupling into layer (a) or for excitation of the surface plasmon in the metal layer.

Light guided in an essentially optically transparent layer (a) may be out-coupled using grating structures (c') which are featured in layer (a).

It is preferred if an analytical system according to the invention comprises in addition at least one positioning element for changing an angle of an incident excitation light between its direction of propagation in free space, characterized by a corresponding k-vector, prior to impingement on a surface of a planar optical structure, for generating an evanescent-field measuring platform, and projection thereof into a plane of the surface of the optical structure. An analytical system according to the invention preferably also comprises at least one positioning element for lateral modification of a site of impingement of an incident excitation light on the planar optical structure.

A special embodiment of an analytical system according to the invention comprises at least one expansion optics with which excitation light from at least one light source is expanded in one direction, if adequately parallel with grating lines of a grating structure featured in layer (a) for in-coupling of excitation light into layer (a) and/or in two spatial directions, if adequately parallel and perpendicular to grating lines of a grating structure featured in layer (a). It is preferred here if a diameter of an incident excitation light bundle on the planar optical film waveguide at least in one direction in the plane of the surface of the waveguide is at least 2 mm, preferably at least 5 mm. These last-named special embodiments are especially well-suited for example to realization of an arrangement of an imaging grating coupler, as described in PCT/EP 01/00605 and fully included in this invention.

It is preferred if an analytical system according to the invention comprises at least one locally resolved detector, which is preferably selected from a group of detectors comprising CCD cameras, CCD chips, photodiode arrays, avalanche diode arrays, multichannel plates and multichannel photomultipliers.

Preference is also for embodiments of an analytical system according to the invention which comprise use of optical components from a group comprising lenses or lens systems for forming transmitted light bundles, planar or curved mirrors for deflection and if necessary additionally for forming light bundles, prisms for deflecting and if necessary for spectral division of light bundles, dichroic mirrors for spectrally selective deflection of parts of light bundles, neutral filters for regulation of transmitted light intensity, optical filters or monochromators for spectrally selective transmission of parts of light bundles or polarization-selective elements for selection of discrete polarization directions of excitation or luminescence light, with these components being arranged between the at least one excitation light source and the planar optical structure according to the invention for generating an evanescent-field measuring platform and/or between the planar optical structure and the at least one detector.

It is possible that excitation light is delivered in pulses with a duration between 1 fsec and 10 minutes, and light emanating from the planar optical structure is measured in a time-resolved manner. In particular, with such an embodiment binding of at least one analyte to recognition elements in various measurement areas can be observed in real time in a locally resolved manner. Respective binding kinetics can be determined from signals recorded in time-resolved measurements. This allows in particular, for example, a comparison of affinities of different ligands to an immobilized biological or biochemical or synthetic recognition element. In this context, any binding partner of such an immobilized recognition element shall be described as a "ligand".

It is preferred if an analytical system according to the invention comprises arrangements which allow (1) measurement of essentially isotropically emitted light from a planar optical film waveguide according to the invention, and optionally measurement areas located thereon or (2) light back-coupled into the optically transparent layer and out-coupled via grating structures featured in layer (a) or light of both parts (1) and (2).

A special embodiment of an analytical system according to the invention comprises arrangements which allow delivery of excitation light and detection of light emanating from at least one measurement area to take place sequentially for single or several measurement areas.

These arrangements may consist in sequential excitation and detection using movable optical components from a group comprising mirrors, deflecting prisms and dichroic mirrors.

An integral part of the invention is also a system wherein sequential excitation and detection take place using an essentially angle- and focus-preserving scanner. It is also possible that the planar optical structure is moved between steps of sequential excitation and detection.

A further subject of the invention is a method for qualitative and/or quantitative detection of at least one analyte in at least one sample, wherein the at least one sample is brought into contact with biological or biochemical or synthetic recognition elements, which are immobilized directly or indirectly, via an adhesion-promoting layer, on a surface of a planar optical structure for generating an evanescent-field measuring platform, according to the invention and any of the embodiments, and wherein changes for in-coupling of an incident excitation light in a waveguiding film (a) of a planar optical film waveguide and/or for out-coupling of light emanating from the film waveguide or for generating a surface plasmon in a metal layer, as a result of the binding of the at least one analyte or of one of binding partners thereof to at least one immobilized recognition element, is measured.

It is preferred if the biological or biochemical or synthetic recognition elements are immobilized in discrete measurement areas.

It is also preferred if the in-coupling of excitation light into the waveguiding layer (a) or the generation of a surface plasmon in the metal layer takes place using at least one grating structure (c) featured in layer (a) or the metal layer, respectively.

Certain embodiments of the process according to the invention comprise detection of at least one analyte being performed on basis of changes in an effective refractive index, as a result of binding of this analyte, and where applicable of one of its binding partners, to biological or biochemical or synthetic recognition elements immobilized on a grating structure featured in layer (a) or the metal layer, respectively, and on basis of resulting changes in resonance conditions for in-coupling excitation light into layer (a) or for generating a surface plasmon in the metal layer using the grating structure.

A characteristic of other embodiments of the method is that at least one analyte is detected on basis of changes in conditions for out-coupling a light guided in layer (a) via a grating structure (c) or (c') featured in layer (a), as a result of binding of this analyte, and where applicable of any of its binding partners, to biological or biochemical or synthetic recognition elements immobilized on the grating structure, and of associated changes in the effective refractive index.

A further preferred subject of the invention is a method for qualitative and/or quantitative detection of at least one analyte in at least one sample, wherein this sample is brought into contact with biological or biochemical or synthetic recognition elements immobilized directly or indirectly, via an adhesion-promoting layer, on a surface of a planar optical structure according to the invention for generating an evanescent-field measuring platform in accordance with one of the embodiments, wherein excitation light from at least one light source is in-coupled into layer (a) and guided therein, and wherein luminescence of molecules capable of luminescence, which are bound to the analyte or to one of its binding partners, is excited and measured in a near-field of layer (a).

The second essentially optically transparent layer (b) here preferably comprises a material from a group formed by cyclo-olefin polymers and cyclo-olefin copolymers.

This method according to the invention enables (1) isotropically emitted luminescence or (2) luminescence in-coupled into the optically transparent layer (a) and out-coupled via grating structure (c) or (c'), or luminescences of both (1) and (2), to be measured simultaneously.

For generation of luminescence, it is preferred if a luminescence dye or luminescent nanoparticle is used as a luminescence label, which can be excited and emits at a wavelength between 300 nm and 1100 nm.

The luminescence label may be bound to the analyte or, in a competitive assay, to an analog of the analyte or, in a multistep assay, to one of binding partners of immobilized biological or biochemical or synthetic recognition elements or to the biological or biochemical or synthetic recognition elements.

A characteristic of special embodiments of the method according to the invention comprises use of a second luminescence label or further luminescence labels with excitation wavelengths either the same as or different from that of the first luminescence label and the same or different emission wavelength. Through appropriate selection of spectral characteristics of luminescence labels used, such embodiments may be designed such that the second luminescence label or further luminescence labels can be excited at the same wavelength as the first luminescence label, but may emit at a different wavelength.

For certain applications, for example for measurements independent of one another with different excitation and detection labels, it is an advantage if excitation spectra and emission spectra of luminescence dyes show little, if any, overlap.

Another special embodiment of the method comprises using charge or optical energy transfer from a first luminescence dye serving as donor to a second luminescence dye serving as acceptor for a purpose of detecting an analyte.

A characteristic of another special embodiment of the method according to the invention comprises determining changes in an effective refractive index on measurement areas in addition to measuring at least one luminescence.

It is an advantage if the at least one luminescence and/or determinations of light signals at an excitation wavelength are performed in a polarization-selective manner. In particular, it is preferred if the at least one luminescence is measured at a polarization different from the one of the excitation light.

The method according to the invention comprises samples to be tested being aqueous solutions, in particular buffer solutions or naturally occurring body fluids such as blood, serum, plasma, urine or tissue fluids. A sample to be tested may also be an optically turbid fluid, surface water, a soil or plant extract, or a biological or synthetic process broth. The samples to be tested may also be prepared from biological tissue parts or cells.

A further subject of the invention is use of a planar optical structure according to the invention for generating an evanescent-field measuring platform according to one of the afore-mentioned embodiments and/or an analytical system according to the invention and/or a method according to the invention for detection of at least one or more analyte for quantitative and/or qualitative analyses to determine chemical, biochemical or biological analytes in screening methods in pharmaceutical research, combinatorial chemistry, clinical and pre-clinical development, for real-time binding studies and to determine kinetic parameters in affinity screening and in research, for qualitative and quantitative analyte determinations, especially for DNA and RNA analytics, for generation of toxicity studies and determination of gene or protein expression profiles, and for determination of antibodies, antigens, pathogens or bacteria in pharmaceutical product research and development, human and veterinary diagnostics, agrochemical product research and development, for symptomatic and pre-symptomatic plant diagnostics, for patient stratification in pharmaceutical product development and for therapeutic drug selection, for determination of pathogens, nocuous agents and germs, especially of salmonella, prions, viruses and bacteria, in food and environmental analytics.

The invention is illustrated in the following examples of embodiments.

EXAMPLES

1. Master

A master is obtained from a planar thin-film waveguide ("chip"), comprising a substrate of AF 45 glass, with dimensions 16 mm×48 mm×0.7 mm, and a coating of tantalum pentoxide (150 nm thick) as waveguiding layer. Parallel with a short side of the "chip", relief gratings spaced 9 mm apart are formed for in-coupling of excitation light into the waveguiding layer, with these gratings having a period of 320 nm, a depth of 12 nm and a length (in a direction of propagation of guided light, i.e. parallel with a longitudinal side of the "chip") of 0.5 mm.

A piece measuring 12 mm×25 mm is cut out of the "chip" such that three gratings are formed thereon with grating lines parallel with a short side of the piece.

2. Process for Manufacture of a Body from a Thermoplastic Plastic/Process for Manufacture of a Planar Optical Film Waveguide According to the Invention Molds of the master described under 1. are manufactured in the following plastics: 1. Polycarbonate (PC), 2. Polymethylmethacrylate (PMMA), 3. Cyclo-olefin copolymer (COC), 4. Cyclo-olefin polymer (COP).

The master is inserted into a molding tool. Molding is performed according to the variotherm injection molding process (A. Rogalla, "Analyse des Spritzgiessens mikrostrukturierter Bauteile aus Thermoplasten", IKV Berichte aus der Kunststoffverarbeitung, Band 76, Verlag Mainz, Wissenschaftsverlag Aachen, Germany, 1998).

The molding tool with this integrated master is closed, producing a cavity therein in the form of a "nest", and is heated to a melting temperature (molding temperature, up to 180° C. for PC, up to 140° C. for PMMA, up to 180° C. for COC and up to 170° C. for COP). An injection unit then travels as far as the nest, which is evacuated at the same time to a residual pressure between 10 mbar and 300 mbar.

Plastic is then injected at a pressure of 800 bar-1800 bar in the case of PC, 600 bar-1200 bar in the case of PMMA, 500 bar-1500 bar in the case of COC, and 500 bar-1800 bar in the case of COP. After the cavity is filled, heating is switched off, and the unit starts cooling down to a demolding temperature (100° C.-140° C. for PC, 70° C.-100° C. for PMMA, 70° C.-160° C. for COC and 80° C.-140° C. for COP, specific to molding in each case).

Before an injected plastic phase solidifies, post-molding is performed (600 bar-1200 bar for PC, 400 bar-600 bar for PMMA, 300 bar-500 bar for COC and 500 bar-1500 bar for COP) to counteract material shrinkage on cooling.

The injection unit then returns, and the cavity (nest) is aerated.

For preparation of a next injection process, new plastic pellets are fed in and plasticized for a next injection. The injection tool is opened, and a molded plastic structure is ejected.

This machine is thus ready for starting a next injection cycle.

What is claimed is:

1. A method for manufacturing an evanescent-field measuring platform including a first layer and a second layer, said second layer being made of an essentially optically transparent thermoplastic plastic comprising manufacturing of said second layer using a master,
   wherein said master is a glass master having a surface coated with metal oxide,
   wherein said manufacturing of said second layer includes directly molding said thermoplastic plastic using said master as part of a molding tool, without deposition of further coatings on said coated surface of said master prior to said directly molding.

2. The method according to claim 1, wherein
said manufacturing an evanescent-field measuring platform further comprises manufacturing a metal layer, as said first layer on said second layer.

3. The method according to claim 2, wherein
raised areas are on the surface of said master such that using said master to produce said second layer results in recesses existing in a surface of said second layer.

4. The method according to claim 3, wherein
said recesses have a depth of from 20 μm to 500 μm.

5. The method according to claim 3, wherein
said recesses have a depth of from 50 μm to 300 μm.

6. The method according to claim 2, wherein
a grating structure and raised areas are on the surface of said master such that using said master to produce said second layer results in a grating and recesses simultaneously existing in a surface of said second layer.

7. The method according to claim 6, wherein
said grating has a depth of from 3 nm to 100 nm, and said recesses have a depth of from 20 μm to 500 μm.

8. The method according to claim 6, wherein
said grating has a depth of from 10 nm to 30 nm, and said recesses have a depth of from 50 μm to 300 μm.

9. The method according to claim 2, wherein
said manufacturing an evanescent-field measuring platform comprises manufacturing a planar optical structure for generating a surface plasmon resonance.

10. The method according to claim 2, wherein
said metal oxide comprises a material selected from the group consisting of $TiO_2$, $ZnO$, $Nb_2O_5$, $Ta_2O_5$, $HfO_2$ and $ZrO_2$.

11. The method according to claim 2, wherein
a grating structure is on the surface of said master such that using said master to produce said second layer results in a grating existing in a surface of said second layer.

12. The method according to claim 2, wherein
said directly molding comprises one of
  (i) directly molding said thermoplastic plastic using said master during an injection molding process,
  (ii) directly molding said thermoplastic plastic using said master during a reaction injection molding process,
  (iii) directly molding said thermoplastic plastic using said master during a liquid injection molding process, and
  (iv) directly molding said thermoplastic plastic using said master during a hot embossing process.

13. The method according to claim 2, wherein
said directly molding comprises directly molding said thermoplastic plastic using said master during an injection molding process.

14. The method according to claim 2, wherein
said directly molding comprises directly molding said thermoplastic plastic using said master during a variotherm injection molding process.

15. The method according to claim 2, wherein
said directly molding comprises directly molding a material selected from the group consisting of polycarbonates, polymethylmethacrylates, cyclo-olefin polymers and cyclo-olefin copolymers.

16. The method according to claim 2, wherein
said directly molding comprises directly mold directly molding a material selected from the group consisting of cyclo-olefin polymers and cyclo-olefin copolymers.

17. The method according to claim 1, wherein
said manufacturing an evanescent-field measuring platform including a first layer and a second layer, produced by using said master, further comprises manufacturing an essentially optically transparent waveguiding layer having a refractive index $n_1$, as said first layer, on an essentially optically transparent thermoplastic plastic layer having a refractive index $n_2$, as said second layer, with $n_1 > n_2$.

18. The method according to claim 17, wherein
raised areas are on the surface of said master such that using said master to produce said second layer results in recesses existing in a surface of said second layer.

19. The method according to claim 18, wherein
said recesses have a depth of from 20 μm to 500 μm.

20. The method according to claim 18, wherein
said recesses have a depth of from 50 μm to 300 μm.

21. The method according to claim 17, wherein
a grating structure and raised areas are on the surface of said master such that using said master to produce said second layer results in a grating and recesses simultaneously existing in a surface of said second layer.

22. The method according to claim 21, wherein
said grating has a depth of from 3 nm to 100 nm, and
said recesses have a depth of from 20 μm to 500 μm.

23. The method according to claim 21, wherein
said grating has a depth of from 10 nm to 30 nm, and
said recesses have a depth of from 50 μm to 300 μm.

24. The method according to claim 17, wherein
said manufacturing an evanescent-field measuring platform comprises manufacturing a planar optical structure for generating a surface plasmon resonance.

25. The method according to claim 17, wherein
said manufacturing an evanescent-field measuring platform comprises manufacturing a planar optical film waveguide.

26. The method according to claim 17, wherein
said metal oxide comprises a material selected from the group consisting of $TiO_2$, $ZnO$, $Nb_2O_5$, $Ta_2O_5$, $HfO_2$ and $ZrO_2$.

27. The method according to claim 17, wherein
a grating structure is on the surface of said master such that using said master to produce said second layer results in a grating existing in a surface of said second layer.

28. The method according to claim 17, wherein
said directly molding comprises one of
  (i) directly molding said thermoplastic plastic using said master during an injection molding process,
  (ii) directly molding said thermoplastic plastic using said master during a reaction injection molding process,
  (iii) directly molding said thermoplastic plastic using said master during a liquid injection molding process, and
  (iv) directly molding said thermoplastic plastic using said master during a hot embossing process.

29. The method according to claim 17, wherein
said directly molding comprises directly molding said thermoplastic plastic using said master during an injection molding process.

30. The method according to claim 17, wherein
said directly molding comprises directly molding said thermoplastic plastic using said master during a variotherm injection molding process.

31. The method according to claim 17, wherein
said directly molding comprises directly molding a material selected from the group consisting of polycarbonates, polymethylmethacrylates, cyclo-olefin polymers and cyclo-olefin copolymers.

32. The method according to claim 17, wherein
said directly molding comprises directly molding a material selected from the group consisting of cyclo-olefin polymers and cyclo-olefin copolymers.

33. The method according to claim 1, wherein
raised areas are on the surface of said master such that using said master to produce said second layer results in recesses existing in a surface of said second layer.

34. The method according to claim 33, wherein
said recesses have a depth of from 20 μm to 500 μm.

35. The method according to claim 33, wherein
said recesses have a depth of from 50 μm to 300 μm.

36. The method according to claim 1, wherein
a grating structure and raised areas are on the surface of said master such that using said master to produce said second layer results in a grating and recesses simultaneously existing in a surface of said second layer.

37. The method according to claim 36, wherein
said grating has a depth of from 3 nm to 100 nm, and
said recesses have a depth of from 20 μm to 500 μm.

38. The method according to claim 36, wherein
said grating has a depth of from 10 nm to 30 nm, and
said recesses have a depth of from 50 μm to 300 μm.

39. The method according to claim 1, wherein
said manufacturing an evanescent-field measuring platform comprises manufacturing a planar optical structure for generating a surface plasmon resonance.

40. The method according to claim 1, wherein
said metal oxide comprises a material selected from the group consisting of $TiO_2$, $ZnO$, $Nb_2O_5$, $Ta_2O_5$, $HfO_2$ and $ZrO_2$.

41. The method according to claim 1, wherein
a grating structure is on the surface of said master such that using said master to produce said second layer results in a grating existing in a surface of said second layer.

42. The method according to claim 1, wherein
said directly molding comprises one of
  (i) directly molding said thermoplastic plastic using said master during an injection molding process,
  (ii) directly molding said thermoplastic plastic using said master during a reaction injection molding process,
  (iii) directly molding said thermoplastic plastic using said master during a liquid injection molding process, and
  (iv) directly molding said thermoplastic plastic using said master during a hot embossing process.

43. The method according to claim 1, wherein
said directly molding comprises directly molding said thermoplastic plastic using said master during an injection molding process.

44. The method according to claim 1, wherein
said directly molding comprises directly molding said thermoplastic plastic using said master during a variotherm injection molding process.

45. The method according to claim 1, wherein
said directly molding comprises directly molding a material selected from the group consisting of polycarbonates, polymethylmethacrylates, cyclo-olefin polymers and cyclo-olefin copolymers.

46. The method according to claim 1, wherein
said directly molding comprises directly molding a material selected from the group consisting of cyclo-olefin polymers and cyclo-olefin copolymers.

47. The method according to claim 2, wherein
said metal oxide comprises a material selected from the group consisting of $TiO_2$, $Nb_2O_5$ and $Ta_2O_5$.

48. The method according to claim 17, wherein
said metal oxide comprises a material selected from the group consisting of $TiO_2$, $Nb_2O_5$ and $Ta_2O_5$.

49. The method according to claim 1, wherein
said metal oxide comprises a material selected from the group consisting of $TiO_2$, $Nb_2O_5$ and $Ta_2O_5$.

* * * * *